US009578653B2

(12) United States Patent
Carbonelli et al.

(10) Patent No.: US 9,578,653 B2
(45) Date of Patent: Feb. 21, 2017

(54) NETWORK ASSISTED PARAMETER ESTIMATION IN THE PRESENCE OF INTER-CELL INTERFERENCE

(71) Applicant: INTEL IP CORPORATION, Santa Clara, CA (US)

(72) Inventors: Cecilia Carbonelli, Munich (DE); Stefan Fechtel, Zorneding (DE); Stefan Franz, Munich (DE); Sabine Roessel, Munich (DE)

(73) Assignee: Intel IP Corporation, Santa Clara, CA (US)

(*) Notice: Subject to any disclaimer, the term of this patent is extended or adjusted under 35 U.S.C. 154(b) by 67 days.

(21) Appl. No.: 14/499,036

(22) Filed: Sep. 26, 2014

(65) Prior Publication Data
US 2016/0095136 A1 Mar. 31, 2016

(51) Int. Cl.
*H04W 4/00* (2009.01)
*H04W 72/12* (2009.01)
*H04L 5/00* (2006.01)
*H04W 72/08* (2009.01)
*H04B 1/12* (2006.01)
*H04B 7/04* (2006.01)
*H04B 7/06* (2006.01)
*H04B 7/02* (2006.01)

(52) U.S. Cl.
CPC ......... *H04W 72/1278* (2013.01); *H04B 1/123* (2013.01); *H04B 7/0456* (2013.01); *H04B 7/0617* (2013.01); *H04B 7/0619* (2013.01); *H04B 7/0626* (2013.01); *H04L 5/0005* (2013.01); *H04L 5/006* (2013.01); *H04W 72/08* (2013.01); *H04B 7/024* (2013.01)

(58) Field of Classification Search
CPC . H04W 72/08; H04W 72/1278; H04L 5/0005; H04L 5/006
See application file for complete search history.

(56) References Cited

U.S. PATENT DOCUMENTS 9,264,191 B2    2/2016  Ellenbeck et al.
9,270,425 B2    2/2016  Xue et al.
(Continued)

FOREIGN PATENT DOCUMENTS

WO    2013113975 A1    8/2013
WO    2014122688 A1    8/2014

OTHER PUBLICATIONS

European Patent Office; International Search Report and Written Opinion for PCT App. No. PCT/US2015/046817 mailed Nov. 20, 2015; 15 pages.
(Continued)

*Primary Examiner* — Ayaz Sheikh
*Assistant Examiner* — Hai-Chang Hsiung
(74) *Attorney, Agent, or Firm* — Schwabe, Williamson & Wyatt, P.C.

(57) ABSTRACT

Embodiments provide improved interference classification and parameter estimation at a User Equipment (UE) that uses received scheduling information associated with interfering cells from a network node together with parameters associated with interfering cells generated locally to the UE to generate an interference mapping data set that may be used to adjust subsequent interference classification and parameter estimation processing in the UE.

15 Claims, 14 Drawing Sheets

(56) References Cited

U.S. PATENT DOCUMENTS

| | | | |
|---|---|---|---|
| 2011/0222525 A1* | 9/2011 | Kishigami | H04J 11/005 370/343 |
| 2014/0044061 A1* | 2/2014 | Yue | H04W 72/042 370/329 |
| 2015/0009903 A1 | 1/2015 | Xue et al. | |
| 2015/0009948 A1 | 1/2015 | Raaf et al. | |
| 2015/0009964 A1 | 1/2015 | Ellenbeck et al. | |
| 2015/0124691 A1* | 5/2015 | Li | H04L 5/005 370/312 |
| 2015/0372796 A1* | 12/2015 | Lee | H04L 5/0048 370/330 |

OTHER PUBLICATIONS

Intel Corporation; 3GPP TSG RAN WG1 Meeting #76; "System-Level Performance Evaluation of R-ML/ML Receivers With and Without Signalling Assistance"; R1-140137; Feb. 10-14, 2014; Prague, Czech Republic; 5 pages.

Intel Mobile Communications; Interference Mitigation (FeICIC) WP Channel Estimation; XMM 7360/7460, Feature and Concept Specification; May 2013; 101 pages.

Intel Mobile Communications; Interference Mitigation (FeICIC)—Scenarios and Testcases; XMM7460; Revision 1.21, Feb. 6, 2014; 66 pages.

3GPP TS 36.521-1 V11.1.0 (Jun. 2013); Technical Specification Group Radio Access Network; Evolved Universal Terrestrial Radio Access (E-UTRA); User Equipment (UE) conformance specification Radio transmission and reception Part 1: Conformance Testing: Release 11; 1332 pages.

Signaling Interference Information for User Equipment Assistance; U.S. Appl. No. 14/778,511, filed Sep. 18, 2015; 71 pages.

3GPP TS 36.133 V11.2.0 (Sep. 2012); Technical Specification Group Radio Access Network; Evolved Universal Terrestrial Radio Access (E-UTRA); Requirements for support of radio resource management; Release 11; 672 pages.

3GPP TS 36.211 V11.6.0 (Sep. 2014); Technical Specification Group Radio Access Network; Evolved Universal Terrestrial Radio Access (E-UTRA); Physical channels and modulation; Release 11; 120 pages.

3GPP TS 36.213 V11.11.0 (Jun. 2015); Technical Specification Group Radio Access Network; Evolved Universal Terrestrial Radio Access (E-UTRA); Physical layer procedures; Release 11; 183 pages.

3GPP TS 36.523-3 V11.5.0 (Sep. 2014); Technical Specification Group Radio Access Network; Evolved Universal Terrestrial Radio Access (E-UTRA) and Evolved Packet Core (EPC); User Equipment (UE) conformance specification Part 3: Test Suites; Release 11; 216 pages.

Ericsson; "New Study Item proposal: CRS Interference Mitigation for Homogenous Deployments"; 3GPP TSG-RAN Meeting # 59; RP-130393; Vienna, Austria, Feb. 26-Mar. 1, 2013; Agenda Item: 13.2; 10 pages.

Mediatek, Renesas Mobile Europe, Broadcom Corporation; "Study on Network-Assisted Interference Cancellation and Suppression for LTE"; 3GPP TSG RAN Meeting #59; RP-130404; Vienna, Austria, Feb. 26-Mar. 1, 2013; Agenda Item: 13.2; 8 pages.

\* cited by examiner

NETWORK ASSISTED PARAMETER ESTIMATION IN THE PRESENCE OF INTER-CELL INTERFERENCE

TECHNICAL FIELD

Embodiments described herein generally relate to the field of wireless communications and, more particularly, to the provision of information to facilitate parameter estimation in a wireless network.

BACKGROUND OF THE INVENTION

In heterogeneous networks where small cells are placed within homogeneous macro coverage, user equipment (UE) will experience significantly higher interference levels compared to a homogeneous macro network scenario. The number of unknown parameters associated with the interfering transmissions makes accurate interference cancellation/suppression challenging and often inaccurate. In addition, interference cancellation/suppression may present a challenge in homogeneous macro networks where UEs are located close to the cell edge.

To help the UE in mitigating the interference, a network assisted interference cancellation (NAICS) study was introduced in Third Generation Partnership Project (3GPP) standardization. NAICS aims at improving inter-cell interference mitigation by providing knowledge about interfering transmissions with possible network coordination to the victim UE. The potential gains of advanced UE receivers with network assistance were identified as part of the study. By increasing the degree of knowledge about interfering transmissions with possible coordination in the network, enhancements to intra-cell and inter-cell interference mitigation at the receiver side may be achieved.

A conventional receiver, which does not receive scheduling information about interfering cells, uses the information transmitted on the control and broadcast channels (PBCH) and other parameters provided by the searcher, and higher layers to obtain a preliminary interference classification. Unfortunately, this information is often not sufficient to correctly assist the receiver in generating accurate estimates of the physical layer parameters. As a consequence, the conventional receiver is designed in a conservative way and for the worst case scenario thus compromising performance in many configurations.

BRIEF DESCRIPTION OF THE DRAWING

Aspects, features and advantages of embodiments of the present invention will become apparent from the following description of embodiments in reference to the appended drawings in which like numerals denote like elements and in which.

DETAILED DESCRIPTION OF EMBODIMENTS

Figure 1:
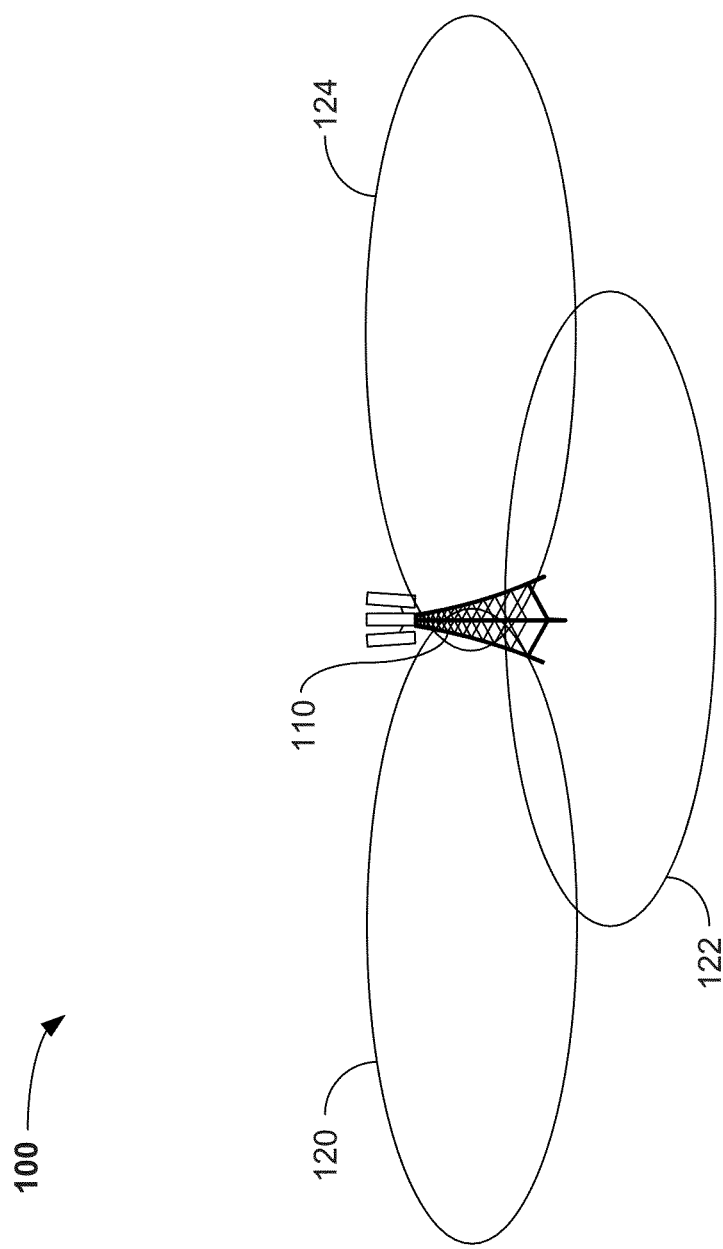
FIG. 1 illustrates a homogeneous macro network scenario in accordance with various embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "according to some embodiments" and "in . . . various embodiments" are used repeatedly. The phrases generally do not refer to the same embodiment; however, they may. The terms "comprising," "having," and "including" are synonymous, unless the context dictates otherwise. The phrase "NB" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

In both homogenous and heterogeneous wireless networks arrangements, the UE may typically operate in a dynamic scenario with multiple interfering cells. In this context, parameter estimation, which is an important factor to the proper functioning of several internal processing blocks within the UE signal processing function(s) (e.g. Channel estimation, Detection, Feedback generation, etc.) faces several challenges, such as:

The ability to deal with a 2-dimensional (time and frequency) observation window where the Signal-to-interference-plus-noise ratio (SINR) level is no longer constant. In principle, the SINR might, for example, change at each subframe and/or at each Physical Resource Block (PRB).

The ability to 'detect' a specific interference configuration and carry out measurements and estimation tasks thereon, whilst using only few 'reliable' observation samples. In the worst case, this detection/estimation would be based on the observation of a single PRB and its corresponding pilots.

According to example embodiments, a user equipment (UE) is provided assistance by using scheduling information of the main interfering cells to allow the UE to improve its parameter estimates, compared to the conventional UE receiver approach. In the following description, the UE that is experiencing interference may be referred to as a 'victim UE'. Assistance information provided by the network includes scheduling information of the interferers and their variations across time and frequency. The scheduling information allows the victim UE to improve parameter estimation by reducing the number of unknowns that need to be estimated by the victim UE. The interpretation of the scheduling information provided by the network may depend on radio resource control (RRC) signaling or broadcast information or the downlink control information (DCI) information in the physical downlink control channel/enhanced physical downlink control channel (PDCCH/ePDCCH) transmitted to the UE. This allows different network vendors to tailor and/or adapt their signaling scheme.

Embodiments of the invention deal with network assisted parameter estimation for wireless networks, for example LTE-Advanced wireless networks, in the presence of inter-cell interference. Some embodiments may also deal with intra-cell interference, where suitable signaling is available at a victim UE.

FIG. 1 illustrates a homogeneous macro network scenario 100 according to an embodiment. In FIG. 1, a single base station, eNodeB, or other network node 110 provides coverage for three cells 120, 122, 124. In FIG. 1, the homogenous macro network 100 may provide intra-site information exchange. However, inter-site information exchange may be subject to the backhaul latency.

Figure 2:
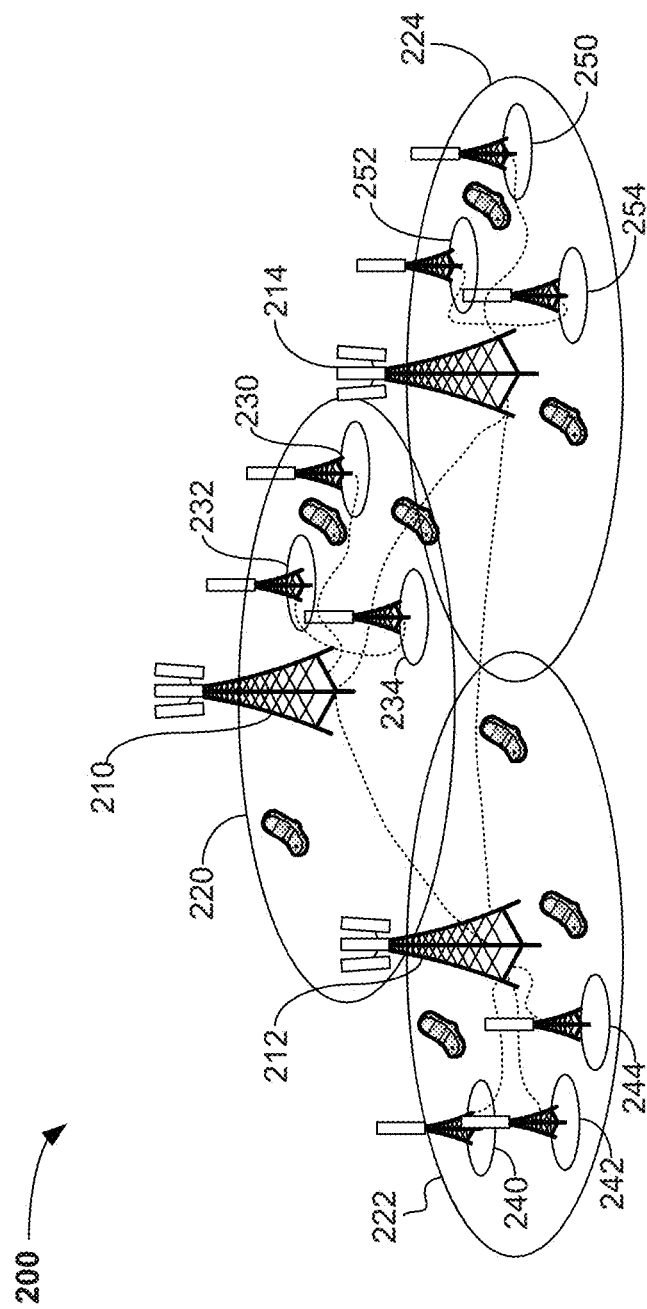
FIG. 2 illustrates a first heterogeneous network in accordance with various embodiments.

FIG. 2 illustrates a first heterogeneous network 200 according to an embodiment. In FIG. 2, three base stations, eNodeBs, or other network nodes 210, 212, 214 provide service coverage for three macro-cells 220, 222, 224. Small cells 230, 232, 234, 240, 242, 244, 250, 252, 254 are shown disposed within cells 220, 222, 224, respectively. Backhaul may be between macro-cells, e.g., 220, 222, 224, and small cells, e.g., small cells 230, 232, 234, 240, 242, 244, 250, 252, 254, within its respective coverage. Backhaul may also be between macro cells of different sites, e.g., between cell 220 and cell 222. Regarding coordination, intra-site information exchange is possible.

Figure 3:
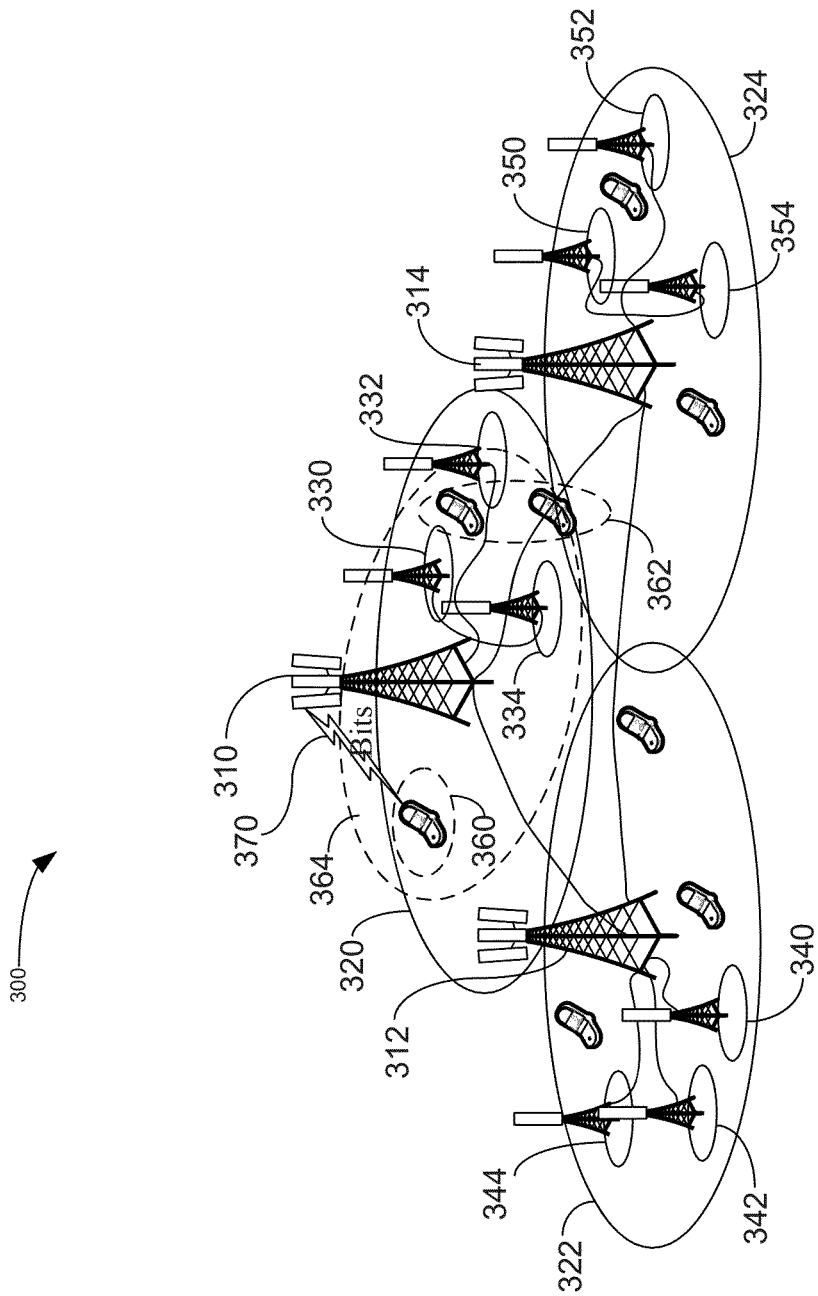
FIG. 3 illustrates a second heterogeneous network in accordance with various embodiments.

FIG. 3 illustrates a second heterogeneous network 300 according to an embodiment. In FIG. 3, three base stations, eNodeBs, or other network nodes 310, 312, 314 provide service coverage for three macro-cells 320, 322, 324. Small cells 330, 332, 334, 340, 342, 344, 350, 352, 354 are shown disposed within macro-cells 320, 322, 324, respectively. However, in FIG. 3, fiber access is provided between network nodes 310, 312, 314 and the small cells 330, 332, 334, 340, 342, 344, 350, 352, 354.

In FIG. 3, backhaul may be provided between macro nodes 310, 312, 314 and small nodes within the network's coverage, and between small nodes under the coverage of one macro, e.g., one of network nodes 310, 312, 314. According to the backhaul assumptions, information exchange is possible for intra-site scenarios, between a macro and a small node within the network's coverage, and among small nodes within the coverage of the same macro, e.g., one of network nodes 310, 312, 314.

Referring to FIG. 3, for example, a base station 310 may serve a signal to one UE 360, to some UEs 362, or to all UEs in a serving cell 364. Current wireless networks do not provide scheduling information about interfering cells to, for example, UE 360. But in example embodiments, by providing scheduling information about interfering cells to the UE 360, the UE 360 may adjust parameter estimation to mitigate interference based on the received scheduling information. The scheduling information provided may include information regarding variations of interfering cells across time and frequency.

It is assumed that the network 300 coordinates fast (e.g. in real-time, or even better) and that the information about the scheduling of the interfering cells is available in time at the primary serving cell 320, e.g., the cell which serves the UE 360.

According to example embodiments, use is made of additional information on the main interferers (e.g. interfering cells or interfering signals) that may be provided by the network (e.g. via an eNB). The receiving UE may then map this information onto two-dimensional Signal-to-Interference-plus-Noise Ratio (SINR) aggregation areas (e.g. on a time-frequency grid/bitmap/data set), and use this 2D SINR information accordingly at the UE receiver, to enable a more reliable 'interference' classification and parameter estimation process therein.

For example, example embodiments may be characterized, in very broad terms, by two specific processing steps:

Step 1) The UE receiver combining internally generated parameters about the interfering cells/signals, and the information provided by the network on the interfering cells/signals (i.e. the specific interference scenario experienced by the UE) to derive SINR 'Aggregation Areas' (AAs), that is, regions in the 2-dimensional (2D) time-frequency map where the SINR can be considered constant.

Step 2) The UE receiver configuring its signal processing (e.g. the signal processing carried out subsequent to the receipt of the interfering signal information) according to the previously derived and now provided 2D SINR Aggregation Areas information, to quickly and dynamically react to changing interference conditions.

Advantages of example embodiments accrue by virtue of the information obtained on the SINR Aggregation Areas being used to benefit parameter estimation in several respects. For example, by virtue of:

1) SINR estimation can be based on a larger set of observations, and thus becomes more accurate.

2) Channel Estimation can more reliably adapt its interpolation filters with respect to the SINR, and better adjust its interpolation windows in time and frequency directions.

3) Subsequent detection and feedback generation functions within the UE receiver can refine/improve the Resource Element classification, which is useful in applying the correct covariance matrices and generating the correct decision/CSI metrics.

Figure 4:
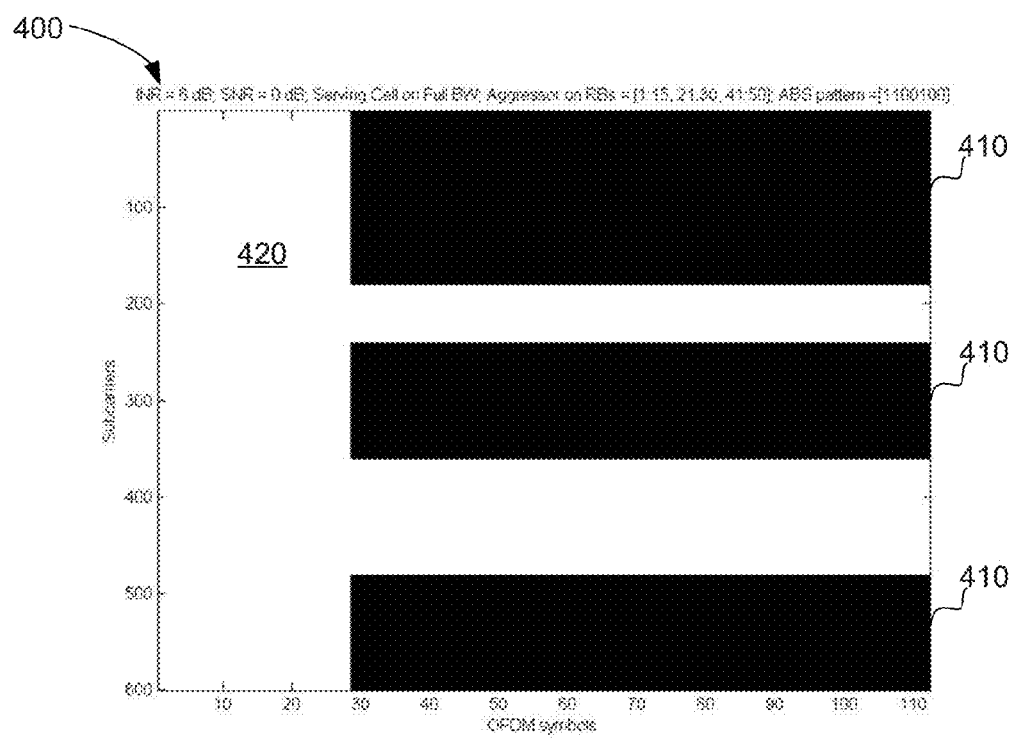
FIG. 4 illustrates a 2D SINR Aggregation Area map in accordance with various embodiments.

As an example, we consider a setup where the serving cell and an aggressor cell (i.e. an interfering cell) occupy the same bandwidth, but the aggressor is scheduled in only a subset of Physical Resource Blocks (PRB). The resulting Aggregation Areas 400 are shown in FIG. 4, for two power levels (SINR=0 dB, white area(s) 420, and SINR=−7 dB, black areas 410). Note that a physical Resource Block (PRB) typically corresponds to a tile of 12 subcarriers×7 OFDM symbols in this example. Also note that in FIG. 4, it is assumed that the SINR in one Aggregation Area is constant.

Figure 5:
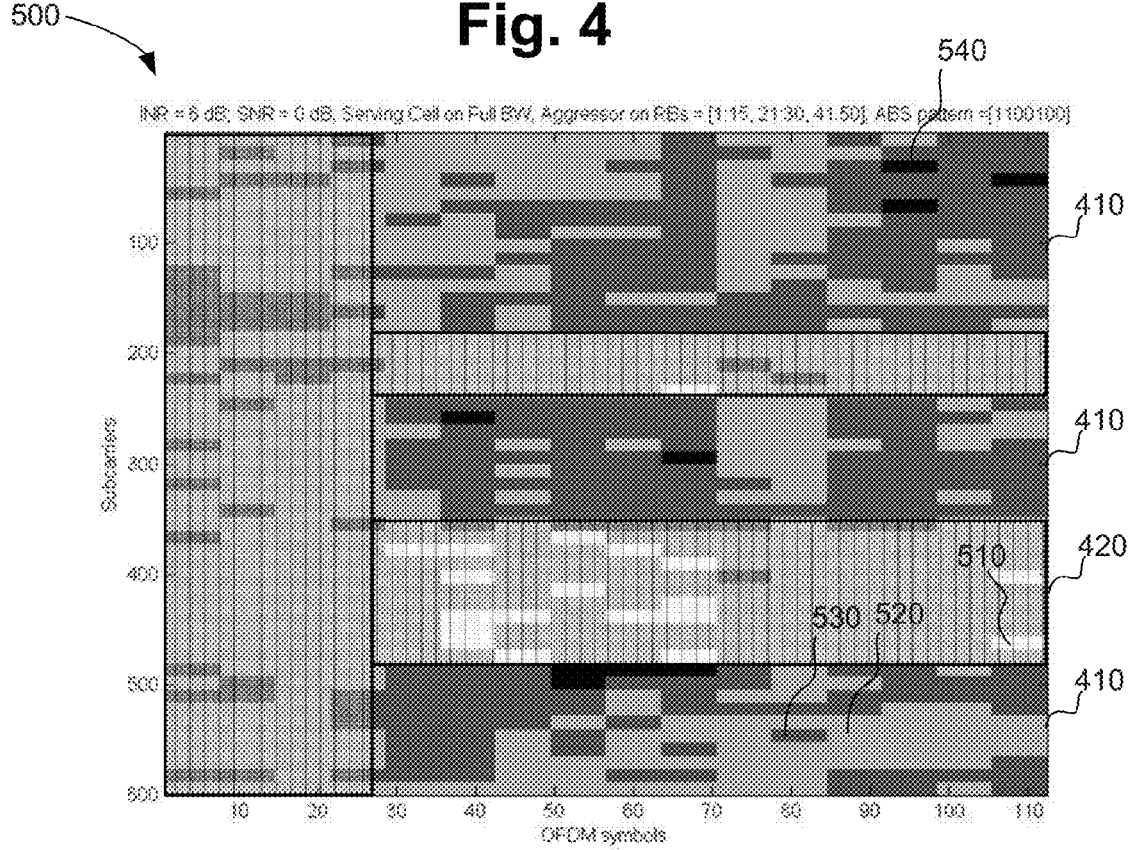
FIG. 5 illustrates SINR estimates with the granularity of a physical resource block in accordance with various embodiments.

The SINR distribution of the per PRB SINR 500 is shown in FIG. 5, for the case of a single aggressor cell that is scheduled on PRBs [1:15, 21:31, 41:50]. The per PRB SINR estimates may be obtained, for example, by processing only those pilot symbols received within the physical resource block. A single SINR estimate may be generated for each physical resource block in the bandwidth of the Serving Cell. Despite variations in the per PRB SINR it can still be seen that there are Aggregation Areas 420 with high per PRB SINR 510, and Aggregation Areas 410 with a lower per PRB SINR 520, 530, 540. These Aggregation Areas need to be blindly estimated or they can be reconstructed with the help of internally generated parameters about the interfering cells/signals, and the information provided by the network. Example embodiments particularly deal with the latter approach.

Figure 6:
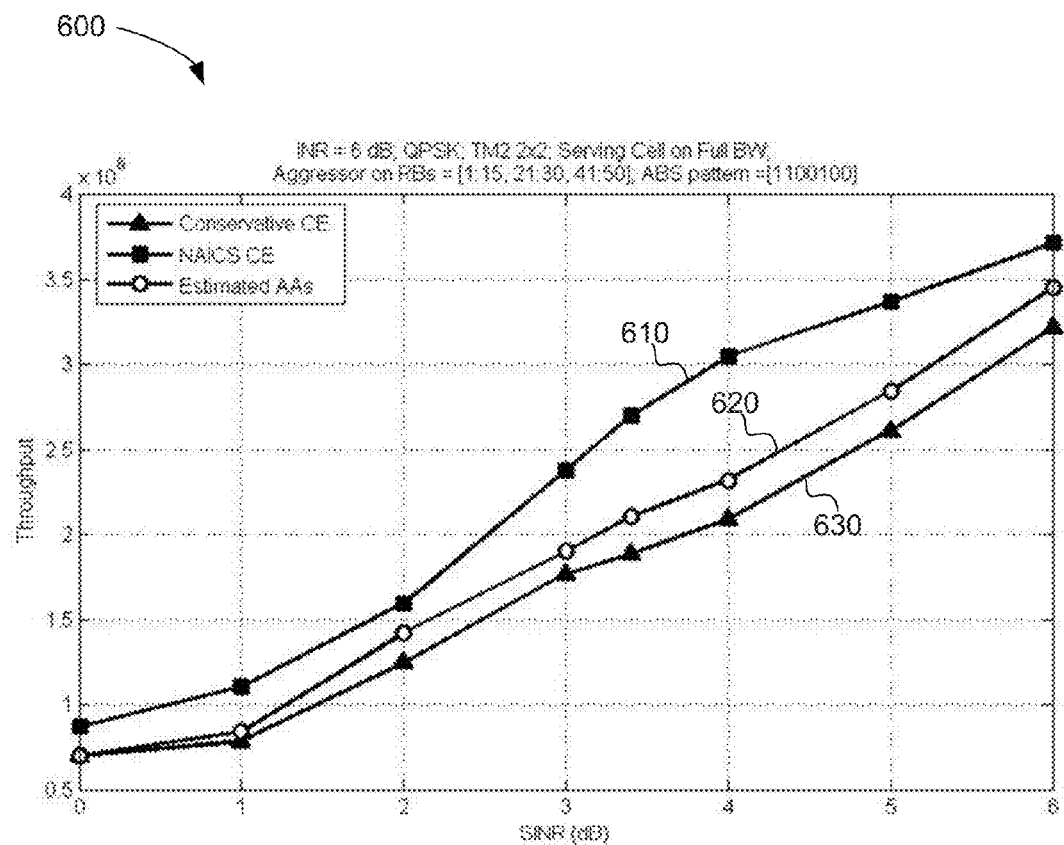
FIG. 6 illustrates a comparison of throughput performance for embodiments according to the invention, compared to other approaches.

When the throughput of example embodiments is tested against the throughput of other techniques, it is shown that the example embodiments have significantly improved performance. The throughput test results 600 are shown in FIG. 6, which shows the results for the following approaches:

a) Network Assisted Parameter Estimation according to the example embodiments of the invention 610. In this specific case, the network provides, via the eNB, the scheduling information on the aggressor(s), and channel estimation benefits from this as described herein.

b) A 'conservative' channel estimator is used (630). The receiver does not attempt generate any SINR Aggregation Areas and instead uses the per PRB SINR estimates (e.g. as shown in FIG. 5) to configure its signal processing despite their inaccuracy.

c) The receiver takes the per PRB SINR estimates (e.g., as shown in FIG. 5) to perform a preliminary blind interference classification 620, without the assistance from the network, and adjusts its interpolation windows based on this classification. Due to the blind nature of this classification, the resulting estimated Aggregation Areas will be subject to errors and inaccuracies.

As a consequence, it may be seen in FIG. 6 that the approach of a) 610 achieves the highest throughput. In fact, the blind approach b) 630 does not exploit the presence of Aggregation Areas at all, and delivers worst-case results. Similarly, approach c) 620 provides an improvement over b) 630, but is not able to estimate the Aggregation Areas accurately enough and thus provides only a minor gain over b) 630.

According to example embodiments, in general, the network may be expected to leverage advanced inter-cell coordination such that, for example only a few dominant interferers exist which can affect a particular UE's receiver performance, and/or the physical resource blocks assigned to the(se) interferers are grouped together as much as possible.

Under these leveraged conditions, the UE receiver can fully benefit from the knowledge of the 2D power level/SINR map (line 610 in FIG. 6). It may be advisable for the network to refrain from dividing PRB allocations into very small sections, because a motley power/SINR map (strong variations with small time/frequency granularity—e.g. in FIG. 5) may render the example embodiment (i.e. proposed NAICS based Channel estimation) ineffective (i.e. a performance close to that of the conservative approach, line 630 in FIG. 6).

Figure 7:
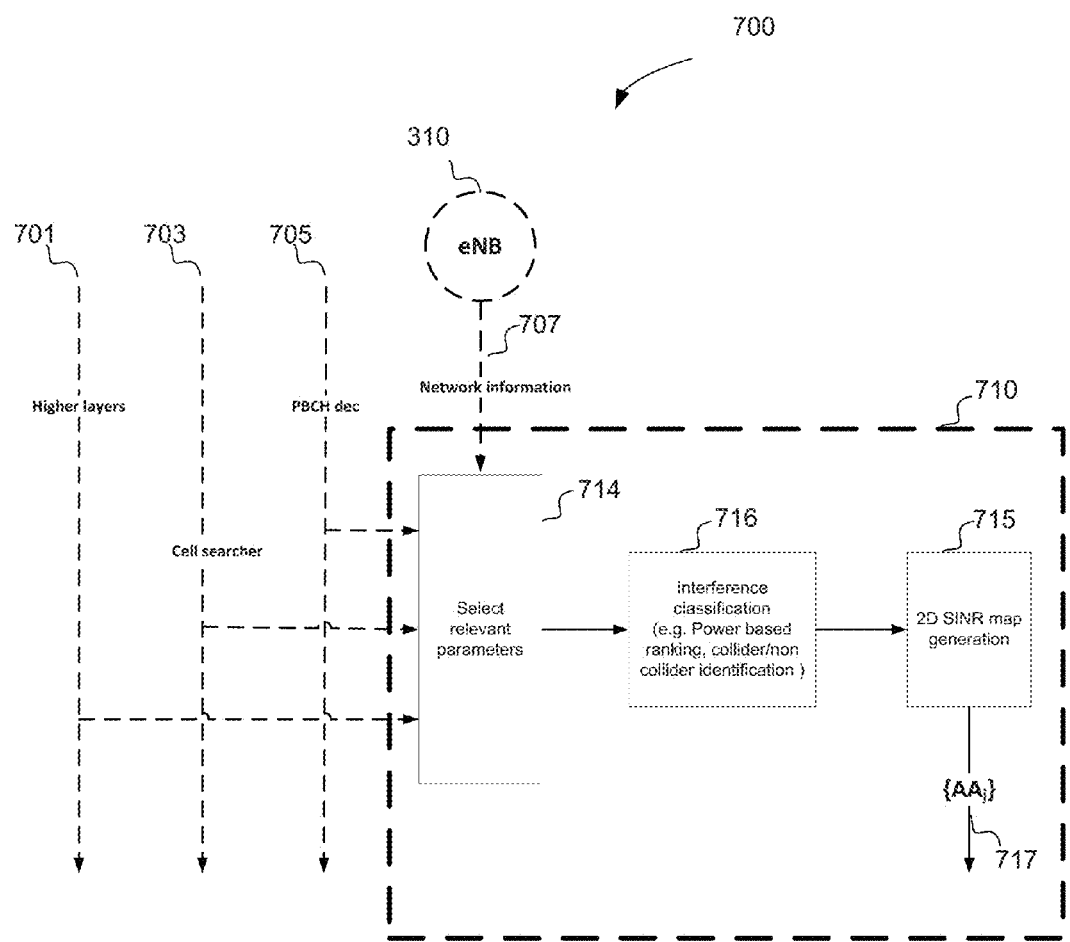
FIG. 7 illustrates a high level block diagram of a UE apparatus in accordance with various embodiments.

The above mentioned, in broad terms, two steps according to example embodiments may be further defined as follows:

Step 1 detail:

FIG. 7 illustrates an example embodiment of the relevant portions of a (victim) UE according to example embodiments. In this figure, an eNB 310 provides network information 707 to an Interference Classification function 710 within the UE. This Interference Classification function 710 may be a dedicated Interference Classification module, a suitable programmed processor, or any functionally equivalent arrangement within a UE (these implantation details also apply to all the other functions yet to be described).

The Interference Classification function 710 may also be provided with other information that is internally generated by the UE 360, for example: higher layer information 701, cell searcher information 703 and Physical Broadcast Channel (PBCH) decoder information 705. Other relevant information may also be provided (not shown).

The overall Interference Classification function 710 may also include a block 714 which selects, depending on the embodiment, some of the input parameters 701, 703, 705, 707, an interference classification block 716 which ranks the interferers based on, for example their power, and/or classifies them based on whether their pilots are colliding or not (i.e. whether they are colliding or non-colliding, as discussed in detail below), and provides this classification information to a 2D SINR map generator 715, which produces the 2D SINR Aggregation Area map, as shown in FIG. 4. It is to be noted that the pilots of two or more cells may be considered colliding if the CellIDs are the same or a multiple-3 of each other (e.g., in a very simple example, where the CellIDs were 3, 9, 27, etc). An interferer may be said to be a collider or non-collider depending on whether its pilots are colliding or not, respectively, with the pilots of the serving cells.

The 2D SINR map generator 715 provides SINR Aggregation Areas (2D map) information 717 for use by the subsequent processing modules. The SINR Aggregation Areas (2D map) information ({AAj}) 717 and input parameters 701, 703, 705, 707 may be used by a number of the subsequent processing modules, including but not necessarily limited to the SINR estimator, Channel estimator, Channel State Information (CSI) Feed Back (FB) and Detector, as detailed below.

As illustrated in FIG. 7, an example UE receiver may use an interference classification module 710 to process the information 707 from the network (e.g. via eNB 310) and combine it with additional UE-internal parameters provided by the cell searcher 703, PBCH decoder 705, and higher layers 701. This internally generated parameter set (701, 703, 705) typically includes, but is not limited to: aggressor (i.e. interferer) cell IDs, number of antenna ports, timing, and power levels. The additional information on the aggressors/interferers provided by the network includes parameters which cannot be easily estimated at the UE receiver (e.g., parameters which otherwise would require decoding of the aggressor control channels). In this way, the requirement to decode the aggressor control channels may be avoided, and thereby save processing time and energy, for example.

Aided by the network and by its own estimated parameters, the UE receiver may then generate a 2D map of SINR levels across time (e.g. slot/subframes) and frequency (e.g. subcarriers). As mentioned above, this 2D map of SINR features a few Aggregation Areas where the (average) SINR observed at the receiver can be considered constant—see FIG. 4.

In the foregoing, the higher layer information (701, 703, 705) may be defined as semi-static information that may be provided to the UE by the network, for example through Radio Resource Control (RRC) signaling and may be valid for several hundreds of subframes at a time. It may include, but is not limited to, information about: a) CellID of interfering cells, the number of antenna ports used by interfering cells, Multicast Broadcast Single-Frequency Network (MBSFN) subframe configuration details of the interfering cells. It may also include the system bandwidth of interfering cells.

In the foregoing, network information 707 (see FIG. 7) may refer to dynamic information that is provided to the UE by the network through one of the ways, for example through Radio Resource Control signaling or through an appropriate physical downlink control channel. Dynamic here means that the update rate may be relatively rather high, e.g. every subframe, or every few sub-frames. It may include, but is not limited to, scheduling information about individual interfering (i.e. aggressor) cells.

Information 703 provided by the Cell searcher may typically include, but not be limited to: a) a CellID of interfering cells (if they are not already provided by the network); b) Signal strength measurements of interfering cells.

Information 705 provided by the PBCH decoder may include, but not be limited to: a) the number of ports of an interfering cell (if not already provided by the network); b) System bandwidth of interfering cells (if not already provided by the network).

There now follows a description of example embodiments that shows how the UE receiver may generate the 2D SINR aggregation areas maps based on: a) higher layer information; b) information provided by the cell searcher module; c) information provided by the PBCH decoder; d) network information According to some example embodiments, the following information may be used: a) signal strength measurements of interfering cells (e.g. provided by cell searcher); b) system bandwidth and center frequency of interfering cells (e.g. provided by PBCH decoder); c) scheduling information about interfering cells (e.g. derived from information provided by the network).

Based on the signal strength measurements the cell searcher decides which are the dominant interferers and combines this information with the Cell ID of each interfering cell to determine whether it is a colliding or a non-colliding interferer.

For the non-colliding interferers, example embodiments may act as detailed below and shown in FIG. 8 for the case where Serving cell 801, Aggressor 1 (i.e. interfering signal 1, of a first interfering cell) 803 and Aggressor 2 (i.e. interfering signal 2, of a second interfering cell) 805 are present.

Figure 8:
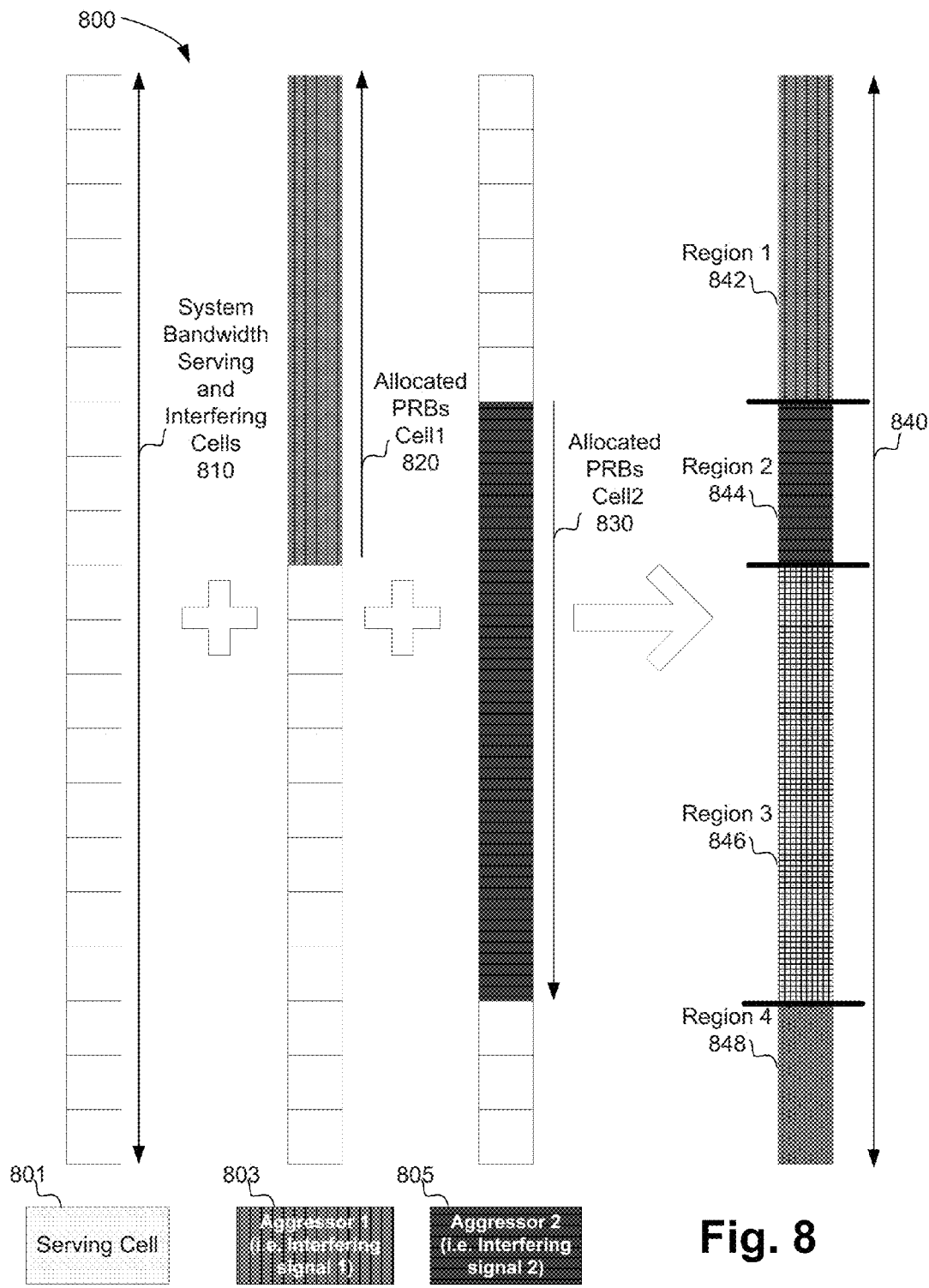
FIG. 8 illustrates a summation of two interferers and a serving signal to form a 'sum SINR' map in a non-colliding situation in accordance with various embodiments.

In FIG. 8, the system bandwidth of the Serving and Interfering cells 810 is overlapped 800 with the Allocated Physical Resource Blocks of a first interfering Cell 820 and the Allocated Physical Resource Blocks of a second interfering Cell 830, to form an overlap result 840, having four regions (in this example). Region 1 842 is a region where the Serving Cell and Interfering Cell 1 are overlapping; Region 2 844 is a region where the Serving Cell, Interfering Cell 1 and Interfering Cell 2 are overlapping; Region 3 846 is a region where the Serving Cell and Interfering Cell 2 are overlapping; Region 4 848 is a region where only no interfering Cell is present, and hence does not (and cannot) overlap with the Serving Cell. It is to be noted that the resource block allocation of the Serving Cell is not shown in FIG. 8 since the per PRB SINR is estimated using the Serving Cell pilot symbols, which occupy the whole bandwidth.

As shown in FIG. 8, the interferers 803, 805 might be scheduled in PRBs which partly overlap with each other and the serving cell signal 801 (i.e. the signal actually intended to be received at the Victim UE). Example embodiments therefore identify those regions where the resulting 'sum SINR' is constant, as shown (which is an example where the cell searcher has identified 2 dominant interfering cells). Note that in FIGS. 8 (and 9, below) only a few PRBs are illustrated for ease of understanding.

An exemplary algorithmic approach to detecting the transitions in FIG. 8, according to some example embodiments, may be as follows:

a) Fix the number of physical resource blocks for the serving user to Nrb b) For the generic user i, generate a vector bit_map_i of size Nrb and assign a '1' to the generic resource block j bit_map_i[j] if the user is scheduled there, and a '0' otherwise.

c) Sum the resulting bit maps obtaining the vector bit_map_sum d) For j=1:1:Nrb−1
If bit_map_sum[j]~=bit_map_sum[j+1],
then set a transition between resource block j and j+1.

Note that all vectors bit_map_i may have a size equal to Nrb and may be initialized to 0. In some examples, where the bandwidths of the different users are different, the 'for loop' in step d) will likely still range over the serving user bandwidth (and corresponding number of PRBS). If the bandwidth of the interfering cell is smaller than the bandwidth of the serving cell, the PRBs bit_map_i[j] with indices outside the serving cell bandwidth may be assigned a '0'.

The example non-collider situation is more relevant to Step 2 of example embodiments (described in more detail below), since colliders may be typically cancelled prior to SINR estimation, channel estimation, and detection.

Figure 9:
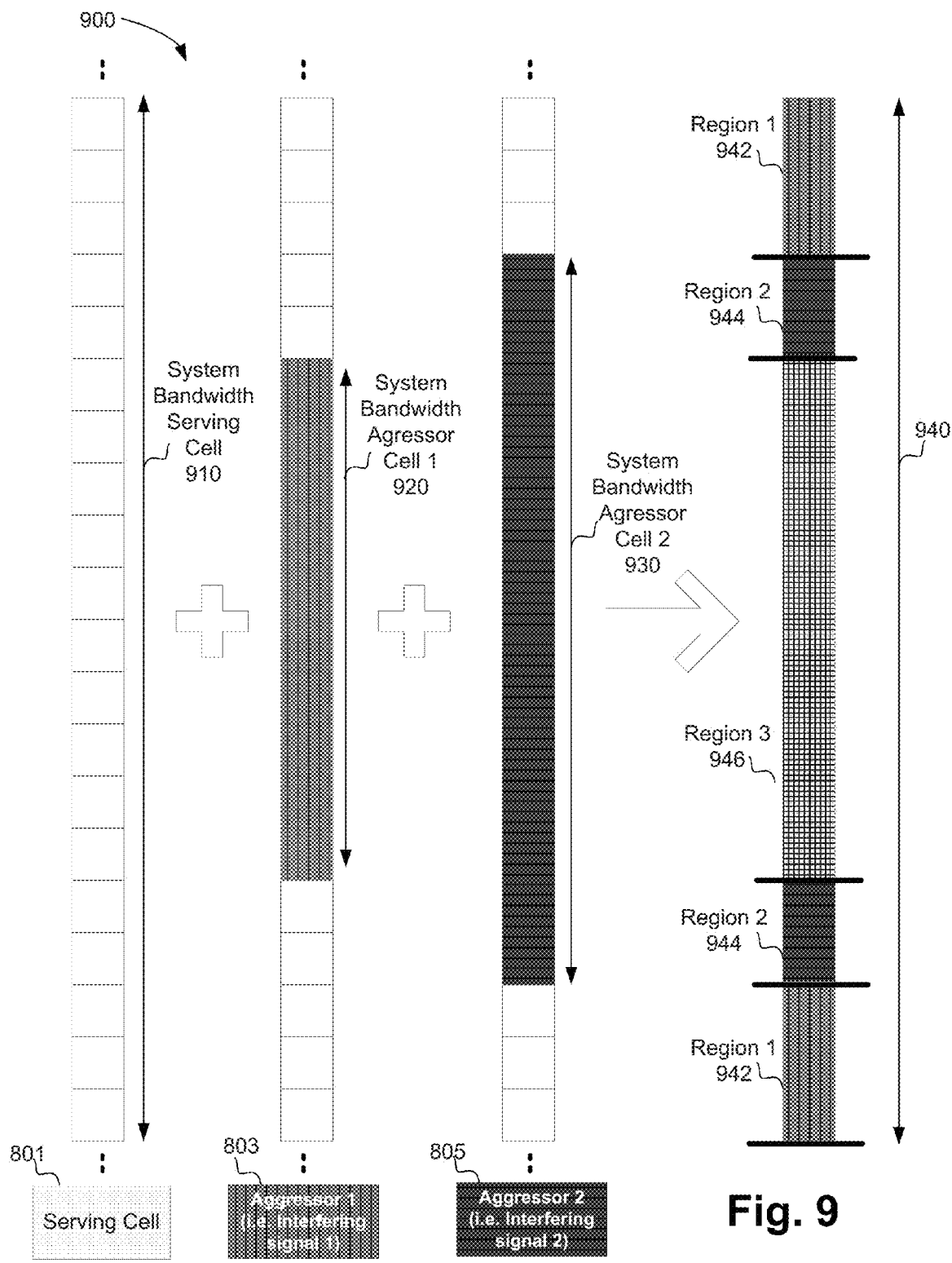
FIG. 9 illustrates a summation of two interferers and a serving signal to form a 'sum SINR' map in a colliding situation in accordance with various embodiments.

For the colliding interferers, example embodiments may act as follows. As for the non-colliding examples, the idea is to identify those regions where the resulting 'sum SINR' is constant as shown in FIG. 9, for an example situation where the cell searcher has identified 2 dominant interfering cells. In FIG. 9, the system bandwidth of the Serving and Interfering cells 910 is overlapped 900 with the System Bandwidth of a first interfering Cell 920 and the System Bandwidth of a second interfering Cell 930, to form an overlap result 940, having five regions, or three types regions (in this example). Note that in FIG. 9 only few PRBs are illustrated for clarity/brevity. Region 1 942 is a region where no Interfering Cell is present; Region 2 944 is a region where the Serving Cell and Interfering Cell 2 overlap; Region 3 946 is a region where the Serving Cell, Interfering Cell 1 and Interfering Cell 2 overlap. A difference between the non-colliding and the colliding situations, i.e. FIG. 8 and FIG. 9, is that in the colliding case we consider the system bandwidth of the interferer cell rather than the scheduling information.

An exemplary algorithmic approach to detecting the transitions in FIG. 9, according to some example embodiments, may be as follows:

a) Fix the number of physical resource blocks for the serving user to Nrb b) For the generic user i, generate a vector bit_map_i and assign a '1' to the generic resource block j bit_map_i[j] if resource block j falls into the system bandwidth of the interfering cell and a '0' otherwise.

c) Sum the resulting bit maps obtaining the vector bit_map_sum d) For j=1:1:Nrb−1
If bit_map_sum[j]~=bit_map_sum[j+1],
then set a transition between resource block j and j+1.

The decision whether to use one or the other embodiment (e.g. the non-collider or collider case) may be taken by the interference classification block 716, based on the powers and CellID of the interfering cells. In the example embodiments described herein, pilot collision is determined for 0, 1 or 2 interferers overlapping, but other numbers of interfering may be involved instead.

It is to be noted that in some example embodiments, a mixed scenario is also possible where one or more Interfering Cells are non-colliding, whilst another one or more Interfering Cell are colliding. In such a mixed scenario, the interference classification block 716 then has to properly initialize the 2D SINR map generation procedure described above for both the non-colliding case and for the colliding case.

Step 2 detail:

Once the 2D SINR AA information is available (717 in FIG. 7), the UE receiver may exploit this knowledge to improve parameter estimation, and also improve the performance of several inner receiver functions, for example the UE receiver function blocks: SINR estimation function, Channel estimator function, CSI FB function and Detector function. In example embodiments these UE receiver function blocks receive, as an additional input, the 2D SINR AA mapping data 717 (i.e. the coordinates of the Aggregation Areas and their respective SINR value). The 2D SINR AA mapping data 717 could take on any suitable form, for example, it may comprise coordinates of the Aggregation areas expressed as start_PRB and end_PRB index, or start_PRB index and number_of_contiguous_PRBs with the same SINR. Any other suitable data arrangement means to convey the requisite 2D SINR AA mapping data may also be used.

Figure 10:
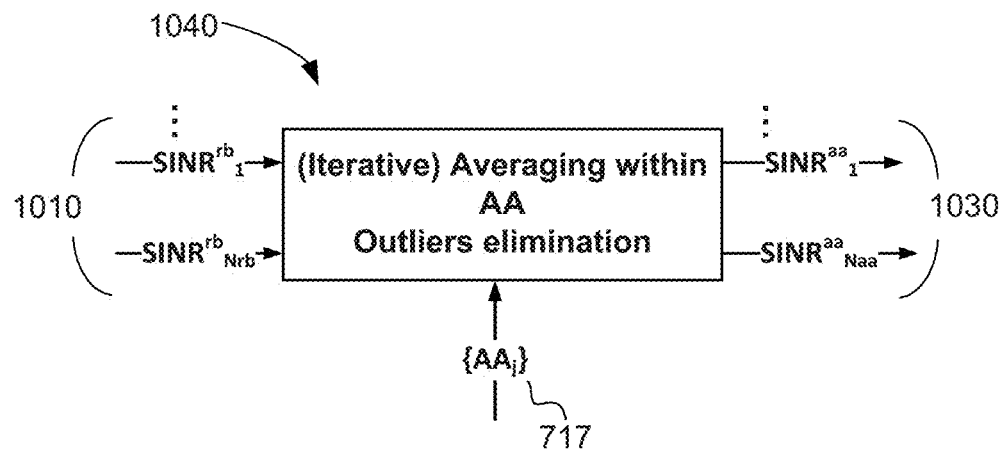
FIG. 10 illustrates an improved SINR Estimation function in accordance with various embodiments.

The additional input to the UE receiver function blocks can be exploited as follows:

SINR estimation (1040):

As shown in FIG. 10, with knowledge of the AAs ({AAj} 717), the Nrb 'per-PRB' SINR estimates (SINRrbi 1010) can be refined by carrying out a second estimation which averages the 'per-PRB' estimates belonging to the same AA and removes possible outliers due to fading, thus improving the SINR accuracy of the Naa (with Naa<<Nrb) 'per-AA' SINR estimates (SINRaaj 1030) which can then be fed to the other blocks as further illustrated below.

Figure 11:
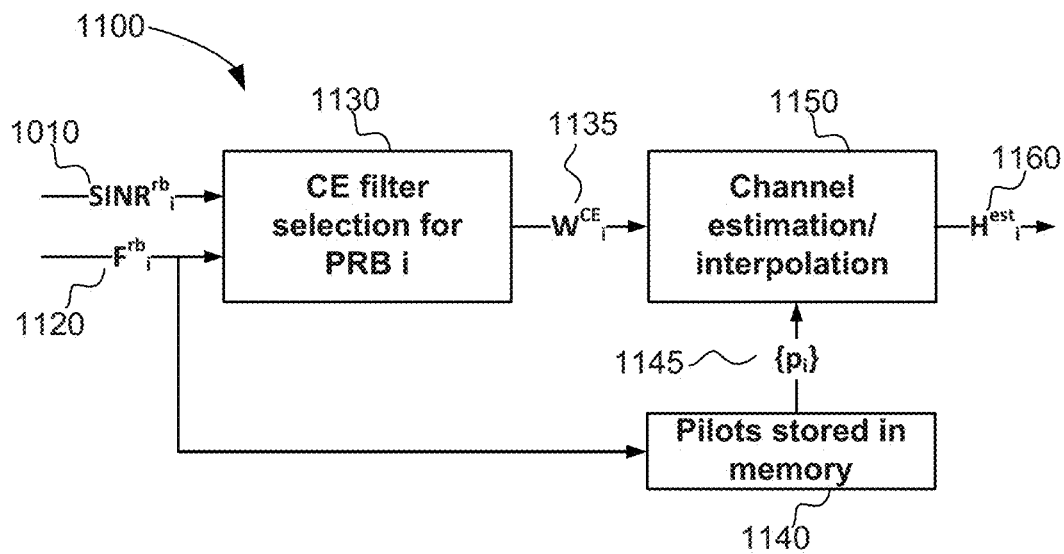
FIG. 11 illustrates a Channel Estimation function according to the prior art.

Channel estimation (1100):

FIG. 11 shows a prior art Channel Estimation process 1100 where the channel estimation window for the generic PRB index i has fixed index and length, no matter what the experienced SINR is at the pilots of interest for that PRB ({pi} 1145). Specifically, given the generic index i, the per-PRB SINR estimate SINRrbi 1010 and the corresponding window position Fopt,irb 1120 a channel estimation filter 1135 is selected in 1130 and passed to the channel estimator/interpolator 1150 which accordingly weights the pilots {pi} 1145 read from memory 1140 based on the given window position to generate channel estimate 1160 Hesti.

Figure 12:
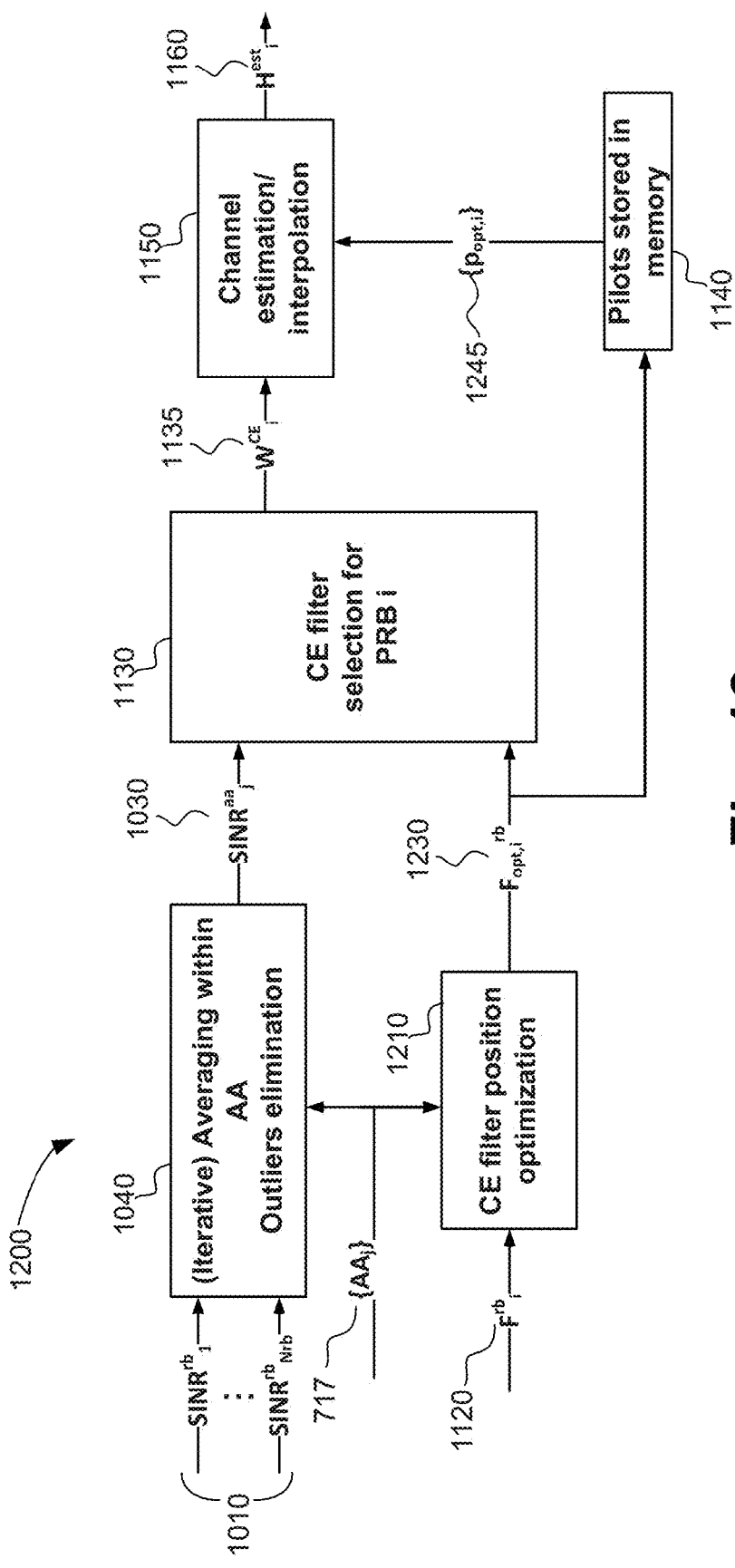
FIG. 12 illustrates an improved Channel Estimation function in accordance with various embodiments.

In an example Channel Estimation 1200 according to an embodiment of the invention (as shown in FIG. 12), the channel estimation window (Fopt,irb 1230) and related pilots ({popt,i} 1245) can be optimized in CE filter position optimization block 1210 so as to ignore those PRBs which suffer from very low SINR, or dynamically switch filters in the presence of SINR level changes. As an example, filters could be dynamically shortened, shifted, punctured, and so on.

Example embodiments therefore provide at least two a twofold benefit:

1) By virtue of more accurate 'per-AA' SINR estimates (SINRaaj 1030), the channel estimator can better select adequate interpolation filters matched to that SINR.

2) By virtue of knowing the AA boundaries ({AAj}), the channel estimator can more judiciously position its initial interpolation window (Frbi 1120).

Whitening for Detection and CSI Feedback Generation

The Detector function and CSI feedback generation function may also use the SINR-based classification of the resource elements, e.g., in order to apply in the Whitening block 1330 the correct whitening filter (which is the inverse of the covariance matrix {Crbi} 1310) to the resource elements 1350 carrying the received data and generate the correct feedback metrics 1370, respectively. Having a-priori knowledge of the 2D SINR AAs will therefore help in:

1) Grouping and classifying the resource elements in an appropriate way.

2) Estimating more accurately the covariance matrices 1310 and the corresponding whitening filters thanks to averaging over a larger set of samples.

Figure 13:
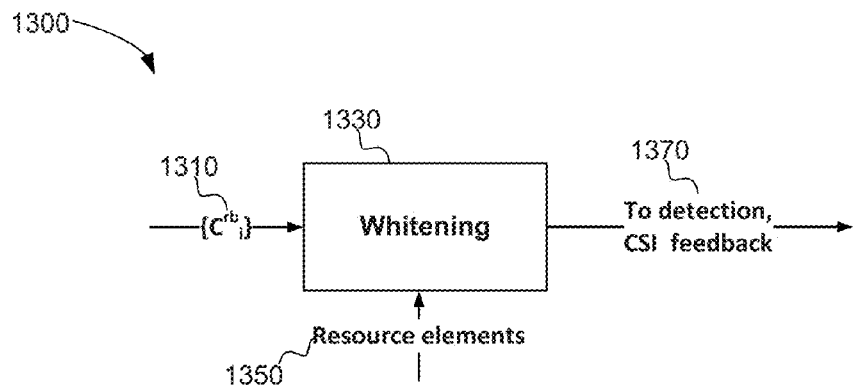
FIG. 13 illustrates a whitening filter function according to the prior art.
Figure 14:
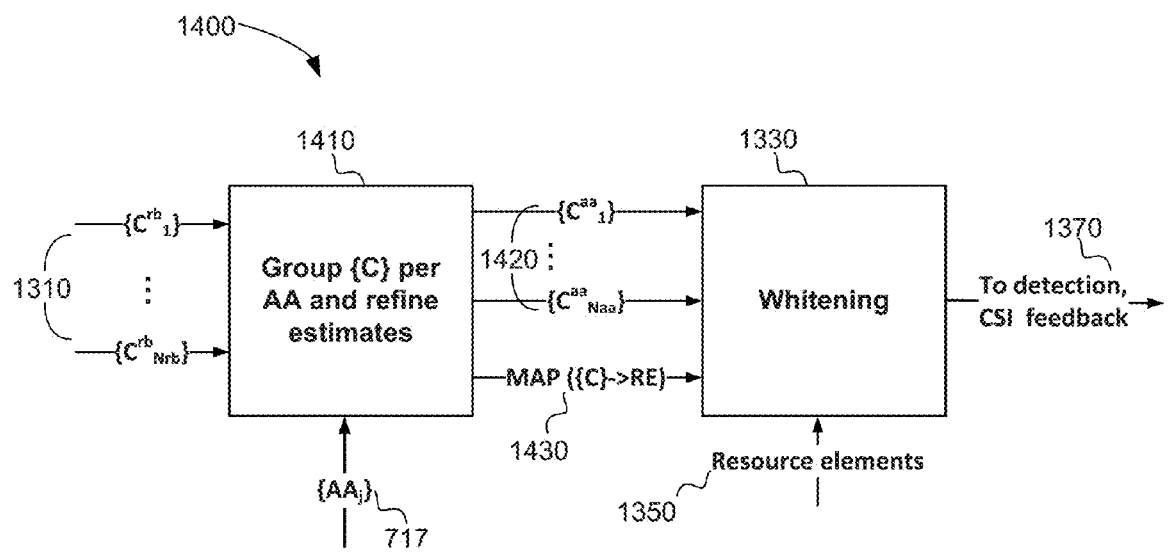
FIG. 14 illustrates an improved whitening filter function in accordance with various embodiments.

This is seen comparing FIG. 13 (a prior art whitening filter arrangement 1300) and FIG. 14 (an example embodiment of the present invention). Note that the covariance matrix {Crbi} 1310 reflects the noise+interference level within a generic PRB of index i. There is in fact a set of matrices per PRB, since, depending on whether a pilot or a data resource element of the aggressor is colliding with the resource element to be processed, the resulting interference power might be higher or lower.

In an example improved whitening filter arrangement 1400 according to an embodiment of the present invention shown in FIG. 14, a new block 1410 is now present which groups the input covariance matrices belonging to the same AA 717 (i.e. {Crbi} 1310, being a set of covariance matrix for the generic PRB of index i), refines them by averaging across a given AA (e.g. using {AAj} 717) and generates, as output, the new 'per AA' set of covariance matrices ({Caaj} 1420) and a map (MAP ({C}→RE) 1430) which assigns the covariance matrix to each Resource Element 1350 based on its position in the time-frequency grid, to provide an output 1370 to the detection and CSI feedback modules.

Accordingly, example embodiments of the invention may provide a superior implementation of SINR estimation, Channel Estimation, CSI Feedback Generation, and Detection based on availability of network information on the interferers observed at the UE receiver.

Figure 15:
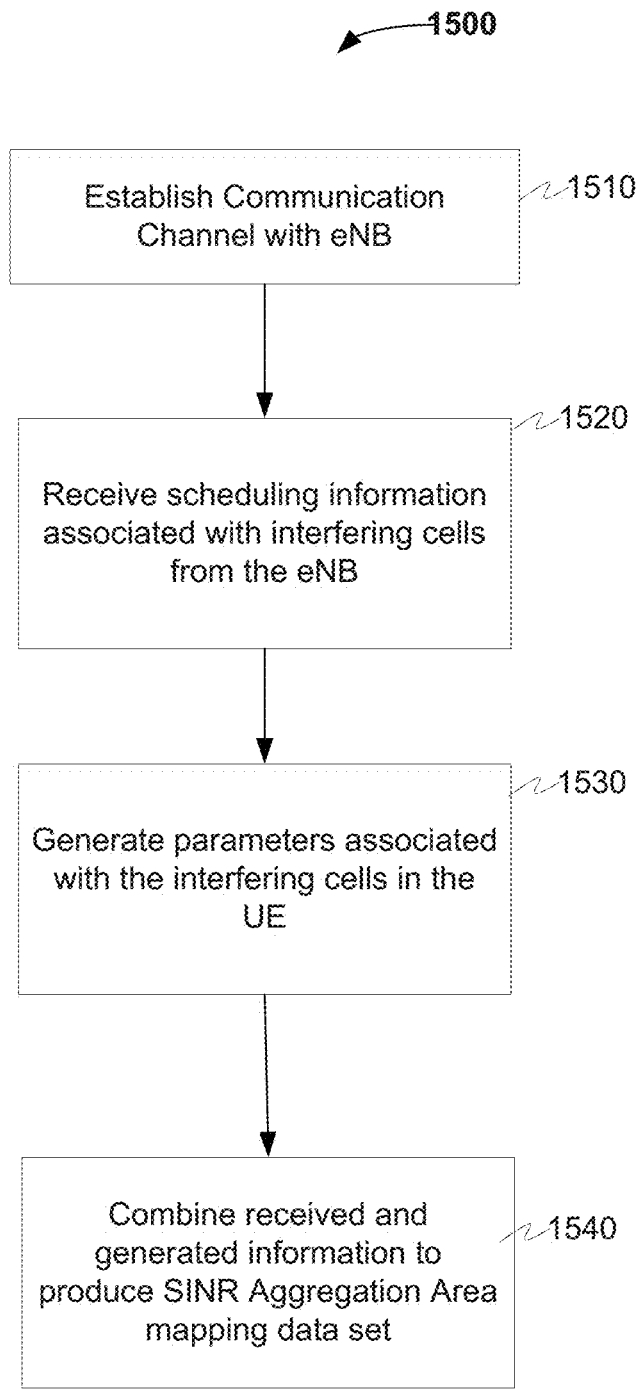
FIG. 15 illustrates an example high level flow chart of a method in accordance with various embodiments.

FIG. 15 shows an example flowchart of a method 1500 according to example embodiments of the invention. The method starts by establishing a communication channel with the eNB 310. This may take the form of receiving, by a user equipment (UE), an initial communication channel set up message or the like 1510.

Regardless of the way in which the communication channel is set up, the method proceeds by the UE receiving 1520 at least one message containing scheduling information associated with interfering cells from the network node, such as the eNB 310.

The method continues by the UE 360 internally generating 1530 information/parameters associated with interfering cells (such as information items 701, 703, 705, etc in FIG. 5).

Once generated, this information can be combined 1540 with the received scheduling information associated with interfering cells from the eNB/network node to derive an interference mapping information—for example the above-described 2D SINR Aggregation Area information, which can then be used by the subsequent processing blocks/functions/modules, to adjust the UE signal processing according to the derived interference mapping information.

While the example embodiments are described with reference to an LTE network, some embodiments may be used with other types of wireless access networks.

Example embodiments may be used in a variety of applications including transmitters and receivers of a radio system, although the present invention is not limited in this respect. Radio systems specifically included within the scope of the present disclosure include, but are not limited to, network interface cards (NICs), network adaptors, fixed or mobile client devices, relays, base stations, femtocells, gateways, bridges, hubs, routers, access points, or other network devices. Further, the radio systems within the scope of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

According to some embodiments, advanced UE receiver structures and corresponding eNB transmitter structures are provided.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick or solid state medium. It will be appreciated that the storage devices and storage media are embodiments of non-transitory machine-readable storage that are suitable for storing a program or programs comprising instructions that, when executed, implement embodiments described and claimed herein. Accordingly, embodiments provide machine executable code for implementing a system, device or method as described herein or as claimed herein and machine readable storage storing such a program. Still further, such programs may be conveyed electronically via any medium such as a communication signal carried over a wired or wireless connection and embodiments suitably encompass the same.

Any such hardware can take the form of a processor, suitably programmable, such as for example, a programmable general purpose processor designed for mobile devices, as a FPGA, or an ASIC, which together constitute embodiment of processing circuitry configured or configurable to perform the functions of the above examples and embodiments. Any such hardware can also take the form of a chip or chip set arranged to operate according to any one or more of the above described diagrams, such diagrams and associated descriptions being taken jointly or severally in any and all permutations.

Figure 16:
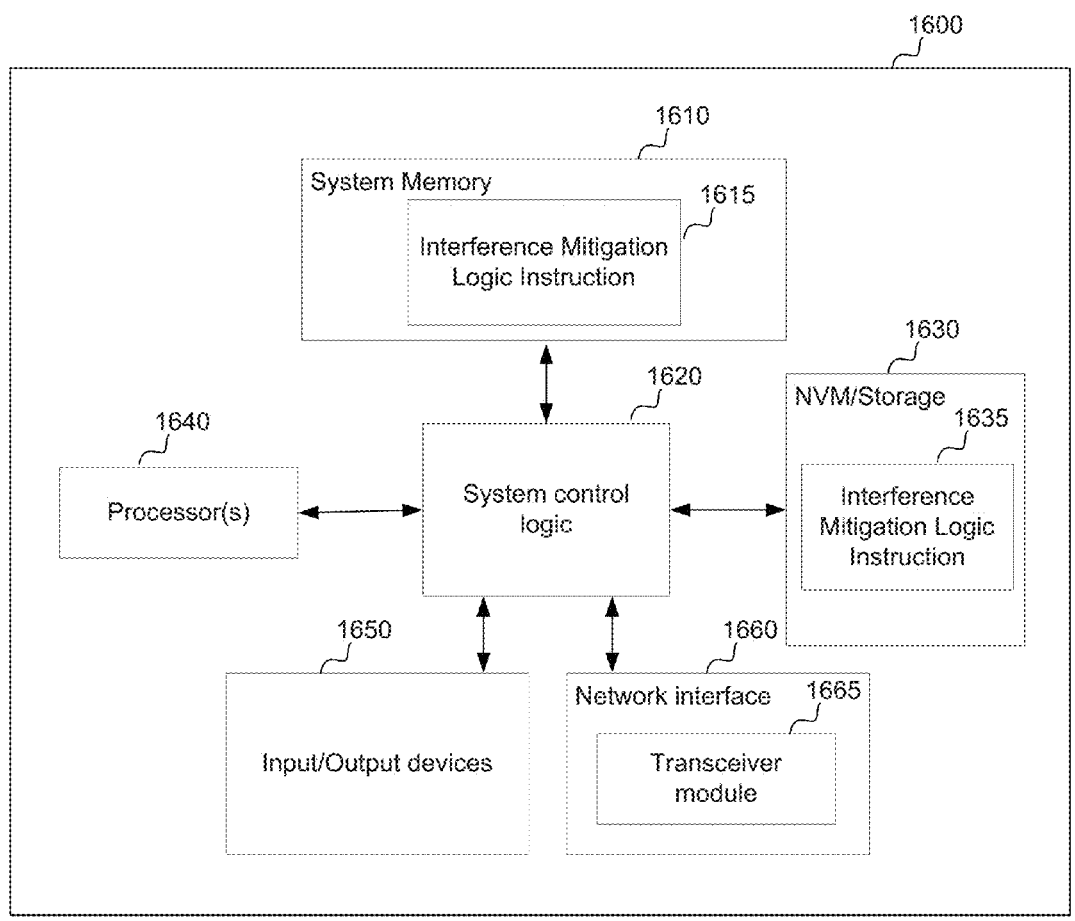
FIG. 16 is a block diagram showing an example system in accordance with various embodiments.

The eNB(s) 310 and UEs (360, 362, 364) described herein may be implemented into a system using any suitable hardware and/or software to configure as desired. FIG. 16 illustrates, for one embodiment, an example system 1600 comprising one or more processor(s) 1640, system control logic 1620 coupled with at least one of the processor(s) 1640, system memory 1610 coupled with system control logic 1620, non-volatile memory (NVM)/storage 1630 coupled with system control logic 1620, and a network interface 1660 coupled with system control logic 1620. The system control logic 1620 may also be coupled to Input/Output devices 1650.

Processor(s) 1640 may include one or more single-core or multi-core processors. Processor(s) 1640 may include any combination of general-purpose processors and dedicated processors (e.g., graphics processors, application processors, baseband processors, etc.). Processors 1640 may be operable to carry out the above described methods, using suitable instructions or programs (i.e. operate via use of processor, or other logic, instructions). The instructions may be stored in system memory 1610, as interference mitigation logic instruction memory portion 1615, or additionally or alternatively may be stored in (NVM)/storage 1630, as NVM interference mitigation logic instruction portion 1635, to thereby instruct the one or more processors 1640 to carry out the improved network assisted parameter estimation techniques described herein.

Processors(s) 1640 may be configured to execute the embodiments of FIGS. 7-15 in accordance with various embodiments. In an embodiment in which the system 1600 implements a network node, such as eNB 310, processor(s) 1640 may be configured to transmit to the UE 360 network information 707. An eNB 310 according to example embodiments may be further arranged carry out advanced inter-cell coordination, for example comprising arranging for only a few dominant interfering signals to exist at the UE. The eNB may also be further arranged to assign Physical Resource Blocks (PRBs) to the dominant interfering signals such that the interfering signals are substantially grouped together.

The eNB may also be further arranged to refrain from dividing PRB allocations into substantially small sections in order to provide SINR aggregation area information with reduced variation across time and/or frequency.

System control logic 1620 for one embodiment may include any suitable interface controllers to provide for any suitable interface to at least one of the processor(s) 1640 and/or to any suitable device or component in communication with system control logic 1620.

System control logic 1620 for one embodiment may include one or more memory controller(s) (not shown) to provide an interface to system memory 1610. System memory 1610 may be used to load and store data and/or instructions, for example, for system 1600. System memory 1610 for one embodiment may include any suitable volatile memory, such as suitable dynamic random access memory (DRAM), for example.

NVM/storage 1630 may include one or more tangible, non-transitory computer-readable media used to store data and/or instructions, for example. NVM/storage 1630 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1630 may include a storage resource physically part of a device on which the system 500 is installed or it may be accessible by, but not necessarily a part of, the device. For example, the NVM/storage 1630 may be accessed over a network via the network interface 1660.

System memory 1610 and NVM/storage 1630 may respectively include, in particular, temporal and persistent copies of, for example, the instructions memory portions holding the interference mitigation logic 1615 and 1635, respectively. Interference mitigation logic instructions portions 1615 and 1635 may include instructions that when executed by at least one of the processor(s) 1640 result in the system 1600 implementing the method(s) of any described embodiment, for example method 1200 in FIG. 12, and any of the further described improvements on the broad method. In some embodiments, instruction portions 1615 and 1635, or hardware, firmware, and/or software components thereof, may additionally/alternatively be located in the system control logic 1620, the network interface 1660, and/or the processor(s) 1640.

Network interface 1660 may have a transceiver module 1665 to provide a radio interface for system 1600 to communicate over one or more network(s) (e.g. wireless communication network) and/or with any other suitable device. In various embodiments, the transceiver 1665 may be integrated with other components of system 1600. For example, the transceiver 1665 may include a processor of the processor(s) 1640, memory of the system memory 1610, and NVM/Storage of NVM/Storage 1630. Network interface 1660 may include any suitable hardware and/or firmware. Network interface 1660 may be operatively coupled to a plurality of antennas to provide a multiple input, multiple output radio interface. Network interface 1660 for one embodiment may include, for example, a network adapter, a wireless network adapter, a telephone modem, and/or a wireless modem.

For one embodiment, at least one of the processor(s) 1640 may be packaged together with logic for one or more controller(s) of system control logic 1620. For one embodiment, at least one of the processor(s) 1640 may be packaged together with logic for one or more controllers of system control logic 1620 to form a System in Package (SiP). For one embodiment, at least one of the processor(s) 1640 may be integrated on the same die with logic for one or more controller(s) of system control logic 1620. For one embodiment, at least one of the processor(s) 1640 may be integrated on the same die with logic for one or more controller(s) of system control logic 1620 to form a System on Chip (SoC).

In various embodiments, the I/O devices 1650 may include user interfaces designed to enable user interaction with the system 1600, peripheral component interfaces designed to enable peripheral component interaction with the system 1600, and/or sensors designed to determine environmental conditions and/or location information related to the system 1600.

Figure 17:
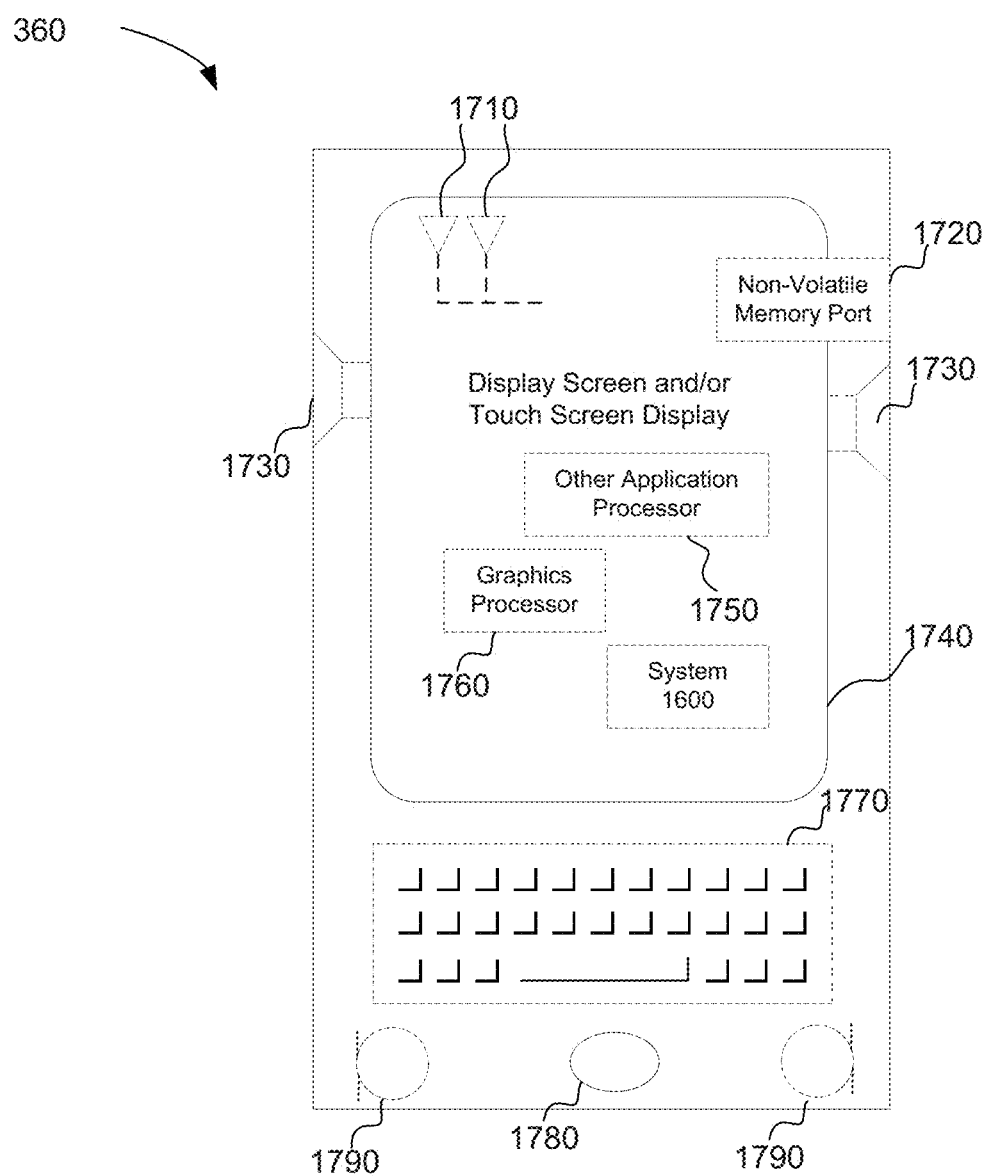
FIG. 17 is a block diagram showing an example wireless apparatus configured for communicating in a wireless network according to one or more of the inventive methods disclosed herein.

FIG. 17 shows an embodiment in which the system 1600 implements a UE 360, in the specific form of a mobile device.

In various embodiments, user interfaces could include, but are not limited to, a display 1740 (e.g., a liquid crystal display, a touch screen display, etc.), a speaker 1730, a microphone 1790, one or more cameras 1780 (e.g., a still camera and/or a video camera), a flashlight (e.g., a light emitting diode flash), and a keyboard 1770, one or more antennas 1710, a NVM memory port 1720, system 1600 of FIG. 16, but may also include a further, e.g. dedicated, graphics processor 1760 and/or other application processors 1750. These latter additional processors being for multimedia and more general computing processing, for example (e.g. as may be particularly used in a tablet computing device, etc).

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1660 to communicate with components of a positioning network, e.g., a global positioning system (GPS) satellite.

In various embodiments, the system 1600 may be a mobile computing device such as, but not limited to, a laptop computing device, a tablet computing device, a netbook, a mobile phone, etc. In various embodiments, system 1600 may have more or less components, and/or different architectures.

In various embodiments, the implemented wireless network may be a 3rd Generation Partnership Project's long term evolution (LTE) advanced wireless communication standard, which may include, but is not limited to releases 8, 9, 10, 11 and 12, or later, of the 3GPP's LTE-A standards.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

Example embodiments may provide a method of interference classification and parameter estimation, comprising: receiving, by a user equipment (UE), scheduling information associated with interfering cells from a network node; generating internally, by the UE, parameters associated with interfering cells; combining the received scheduling information associated with interfering cells from a network node and the internally generated parameters associated with interfering cells to derive an interference mapping information; and adjusting, by the UE, signal processing in the UE according to the derived interference mapping information.

Example embodiments may provide a method wherein the interference mapping information comprises Signal-to-Interference-plus-Noise Ratio (SINR) aggregation area information.

Example embodiments may provide a method wherein the Signal-to-Interference-plus-Noise Ratio (SINR) aggregation area information comprises information about a plurality of regions in a 2-dimensional time-frequency map where the SINR can be considered constant.

Example embodiments may provide a method wherein the internally generated parameters associated with interfering cells comprises information from a cell searcher, PBCH decoder or other higher layer function(s) in the UE, wherein the information comprise any one or more of: interfering cell Identifications (IDs); signal strength measurement information about the interfering signals at the UE; number of antenna ports in use at the UE or eNB; timing information, and/or power level information.

Example embodiments may provide a method wherein the signal processing in the UE according to the derived interference mapping information comprises parameter estimation for mitigating interference based on the received scheduling information.

Example embodiments may provide a method wherein the receiving of the scheduling information includes receiving information regarding variations of interfering cells across time and frequency.

Example embodiments may provide a method wherein adjusting signal processing in the UE further comprises carrying out channel estimation, wherein the channel estimation further includes adapting at least one interpolation filter based on the SINR.

Example embodiments may provide a method wherein adjusting signal processing in the UE further comprises further comprises adapting at least one interpolation window in time and frequency directions based on SINR aggregation area information.

Example embodiments may provide a method wherein adjusting signal processing in the UE further comprises a subsequent detection step and/or applying of covariance matrices step and/or Channel State Information (CSI) feedback step.

Example embodiments may provide a method wherein adjusting signal processing in the UE further comprises an iterative refinement of a resource element classification for use in the applying of covariance matrices step and/or Channel State Information (CSI) feedback step.

Example embodiments may provide a method further comprising a collision determination, said collision determination comprising determining whether interfering signals are colliding or non-colliding and adjusting the signal processing in the UE according to the collision determination.

Example embodiments may provide a method wherein the collision determination comprises detecting transitions between individual PRBs and/or summing individual SINR values for PRBs.

Example embodiments may provide a method wherein the collision determination is adjusted according to serving user bandwidth information.

Example embodiments may provide a method wherein adjusting signal processing in the UE further comprises correcting a whitening filter and generating corrected feedback matrices dependent upon the derived SINR aggregation area information.

Example embodiments may also provide a user equipment (UE), comprising: a transceiver arranged to receive scheduling information associated with interfering signals from a network node; and at least one processor arranged to: generate, internally to the UE, parameters associated with the interfering signals; combine the parameters generated internally to the UE and the received scheduling information to form an interference mapping comprising Signal-to-Interference-plus-Noise Ratio (SINR) aggregation area information; and wherein the at least one processor is further arranged to adjust parameter estimation for mitigating interference based on the Signal-to-Interference-plus-Noise Ratio (SINR) aggregation area information.

Example embodiments may provide a UE wherein the Signal-to-Interference-plus-Noise Ratio (SINR) aggregation area information comprises information about a plurality of regions in a 2-dimensional time-frequency map where the SINR can be considered constant.

Example embodiments may provide a UE wherein the one or more processors are further arranged to internally generate parameters associated with interfering signals comprising information from a cell searcher, a PBCH decoder or other higher layer function(s) in the UE, wherein the information comprises any one or more of: interfering cell Identifications (IDs); signal strength measurement information about the interfering signals at the UE; number of antenna ports in use at the UE or eNB; timing information, and/or power level information.

Example embodiments may provide a UE wherein the one or more processors are further arranged to adjust parameter estimation for mitigating interference based on the received scheduling information.

Example embodiments may provide a UE wherein the scheduling information includes receiving information regarding variations of interfering cells across time and frequency.

Example embodiments may provide a UE wherein the one or more processors are further arranged to adapt at least one interpolation filter based on the SINR, the adapted interpolation filter for use in carrying out channel estimation.

Example embodiments may provide a UE wherein the one or more processors are further arranged to adapt at least one interpolation window in time and frequency directions based on SINR aggregation area information.

Example embodiments may provide a UE wherein the one or more processors are further arranged to carry out: a subsequent detection step and/or application of covariance matrices step and/or Channel State Information (CSI) feedback step.

Example embodiments may provide a UE wherein the one or more processors are further arranged to perform an iterative refinement of a resource element classification for use in the applying of covariance matrices step and/or Channel State Information (CSI) feedback step.

Example embodiments may provide a UE wherein the one or more processors are further arranged to provide a collision determination by determining whether interfering signals are colliding or non-colliding; and adjust the signal processing in the UE according to the collision determination.

Example embodiments may provide a UE wherein the collision determination comprises detecting transitions between individual PRBs and/or summing individual SINR values for PRBs.

Example embodiments may provide a UE wherein the collision determination is adjusted according to serving user bandwidth information.

Example embodiments may provide a UE wherein the one or more processors are further arranged to correct a whitening filter and generate corrected feedback matrices dependent upon the derived SINR aggregation area information.

Example embodiments may provide at least one non-transitory machine readable medium comprising instructions that, when executed by the machine, cause the machine to perform operations for classifying interference and estimating parameters, the operations comprising: receiving, by a user equipment (UE), information associated with interfering signals from a network node; generating local information on the interfering signals; and combining the received information associated with interfering signals from a network node and the generated local information on the interfering signals to form a mapping information data set including information on at least one region in a two-dimensional time vs frequency map of the PRBs where a Signal-to-interference-plus-noise ratio is considered constant by the UE; and adjusting, by the UE, parameter estimation for mitigating interference based on the mapping information data set.

Example embodiments may provide at least one non-transitory machine readable wherein the receiving the information associated with interfering signals from a network node includes receiving information regarding variations of interfering cells across time and frequency.

Example embodiments may provide a network node, or eNB, suitably arranged to provide the network information useful in the UE for carryout example embodiments of the invention.

Example embodiments may provide a network node, or eNB, where the signals served by the eNB, or other eNBs, are suitably coordinated, for example using advanced inter-cell coordination, comprising arranging for only a few dominant interfering signals to exist at the UE; optionally further comprising assigning PRBs to the dominant interfering signals such that the interfering signals are substantially grouped together.

Example embodiments may provide a network node, or eNB, where the network node/eNB refrains from dividing RB allocations into substantially small sections in order to provide a SINR aggregation area information with reduced variation across time and/or frequency.

In various embodiments, a non-transient computer readable medium may be provided comprising computer program instructions that when executed on a processor cause any herein described method to be performed.

What is claimed is:

1. A method of interference classification and parameter estimation, comprising:
   receiving, by a user equipment (UE), scheduling information associated with interfering cells from a network node;
   generating internally, by the UE, parameters associated with interfering cells;
   combining the received scheduling information associated with interfering cells from a network node and the internally generated parameters associated with interfering cells to derive an interference mapping information, wherein the interference mapping information comprises Signal-to-Interference-plus-Noise Ratio (SINR) aggregation area information and wherein the SINR aggregation area information comprises information about a plurality of regions in a two-dimensional time-frequency map where the SINR can be considered constant;
   adjusting the parameter estimation to mitigate interference based on the SINR aggregation area information;
   adjusting, by the UE, signal processing in the UE according to the derived interference mapping information, and
   providing a collision determination by determining whether interfering signals of the interfering cells are colliding or non-colliding, wherein the collision determination comprises detecting transitions between individual physical resource blocks (PRBs) and/or summing individual SINR values for PRBs.

2. The method of claim 1, wherein the internally generated parameters associated with interfering cells comprise information from a cell searcher, control and broadcast channel (PBCH) decoder or other higher layer function(s) in the UE, wherein the information comprises any one or more of: interfering cell Identifications (IDs); signal strength measurement information about interfering signals at the UE; number of antenna ports in use at the UE or an evolved NodeB (eNB); timing information, and/or power level information.

3. The method of claim 1, wherein the receiving of the scheduling information includes receiving information regarding variations of interfering cells across time and frequency.

4. The method of claim 1, wherein adjusting signal processing in the UE further comprises carrying out channel estimation, wherein the channel estimation further includes adapting at least one interpolation filter based on an SINR.

5. The method of claim 1, wherein adjusting signal processing in the UE further comprises a subsequent detection step and/or applying of covariance matrices step and/or Channel State Information (CSI) feedback step.

6. The method of claim 1, further comprising a collision determination, said collision determination comprising determining whether interfering signals are colliding or non-colliding and adjusting the signal processing in the UE according to the collision determination.

7. The method of claim 1, wherein adjusting signal processing in the UE further comprises correcting a whitening filter and generating corrected feedback matrices dependent upon the derived SINR aggregation area information.

8. A user equipment (UE), comprising:
   a transceiver arranged to receive scheduling information associated with interfering signals from a network node; and
   one or more processors arranged to:
     generate, internally to the UE, parameters associated with the interfering signals;
     combine the parameters generated internally to the UE and the received scheduling information to form an interference mapping comprising Signal-to-Interference-plus-Noise Ratio (SINR) aggregation area information, wherein the SINR aggregation area information comprises information about a plurality of regions in a two-dimensional time-frequency map where the SINR can be considered constant;

provide a collision determination based on whether the interfering signals are colliding or non-colliding;

adjust parameter estimation for mitigating interference based on the SINR aggregation area information, adjust signal processing in the UE according to the interference mapping;

wherein the collision determination is based on detected transitions between individual physical resource blocks (PRBs) and/or a sum of individual SINR values for PRBs.

9. The user equipment of claim 8, wherein the one or more processors are further arranged to internally generate parameters associated with interfering signals comprising information from a cell searcher, a PBCH decoder or other higher layer function(s) in the UE, wherein the information comprises any one or more of: interfering cell Identifications (IDs); signal strength measurement information about the interfering signals at the UE; number of antenna ports in use at the UE or an eNB; timing information, and/or power level information.

10. The user equipment of claim 8, wherein the one or more processors are further arranged to adjust parameter estimation for mitigating interference based on the received scheduling information.

11. The user equipment of claim 10, wherein the scheduling information includes receiving information regarding variations of interfering cells across time and frequency.

12. The user equipment of claim 8, wherein the one or more processors are further arranged to adapt at least one interpolation filter based on the SINK, the adapted interpolation filter for use in carrying out channel estimation.

13. The user equipment of claim 8, wherein the collision determination is adjusted according to serving user bandwidth information.

14. At least one non-transitory machine readable medium comprising instructions that, when executed by the machine, cause the machine to perform operations for classifying interference and estimating parameters, the operations comprising:

receiving, by a user equipment (UE), information associated with interfering signals from a network node;

generating local information on the interfering signals; and combining the received information associated with interfering signals from a network node and the generated local information on the interfering signals to form a mapping information data set including information on at least one region in a two-dimensional time vs. frequency map of physical resource blocks (PRBs) where a Signal-to-Interference-plus-Noise Ratio (SINR) is considered constant by the UE;

adjusting, by the UE, parameter estimation for mitigating interference based on the mapping information data set; and providing a collision determination by determining whether interfering signals of interfering cells are colliding or non-colliding, wherein the collision determination comprises detecting transitions between individual physical resource blocks (PRBs) and/or summing individual SINR values for PRBs.

15. The at least one non-transitory machine readable medium of claim 14, wherein the receiving the information associated with interfering signals from a network node includes receiving information regarding variations of interfering cells across time and frequency.

* * * * *